March 6, 1956  G. M. J. CREMER  2,736,943
TUNNEL KILN FOR FIRING CERAMIC ARTICLES
Original Filed Sept. 24, 1949  7 Sheets-Sheet 1
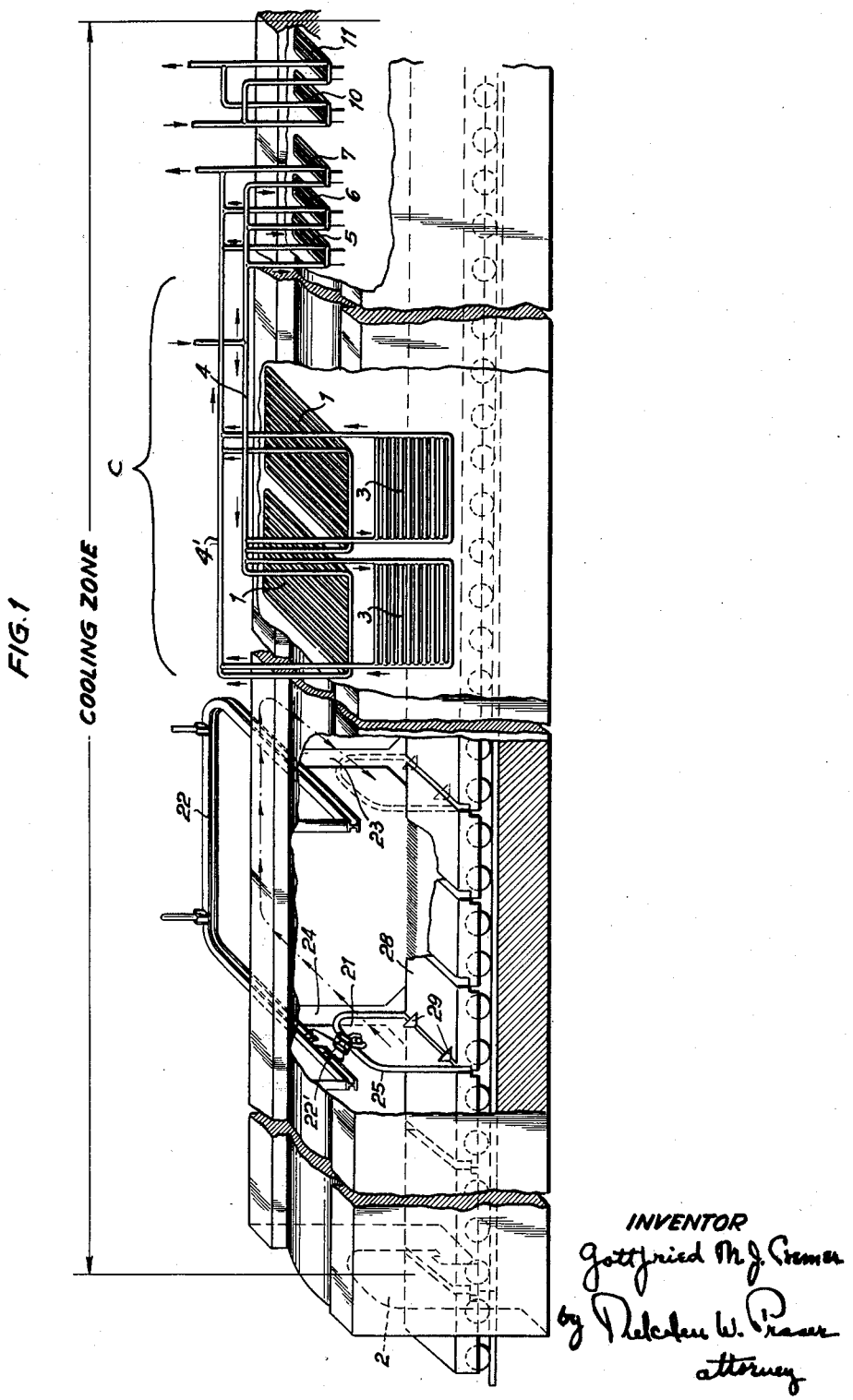

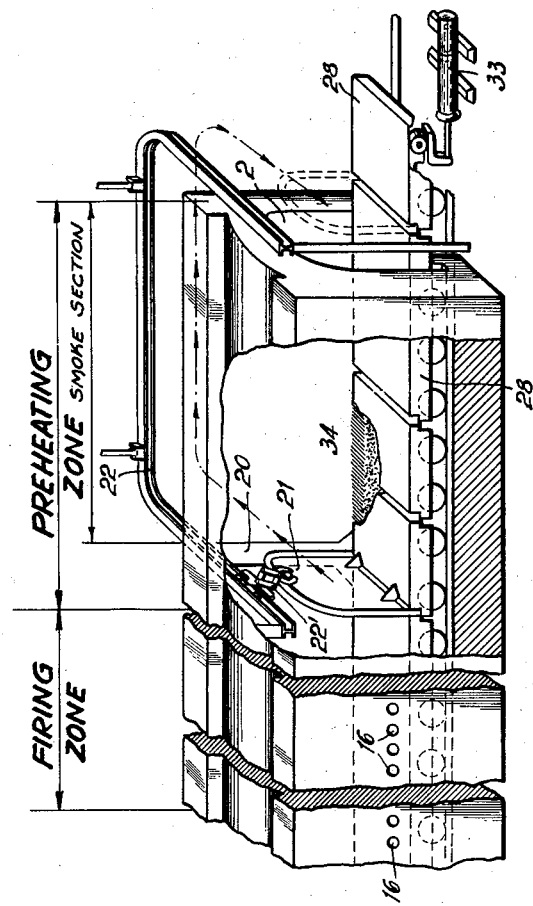

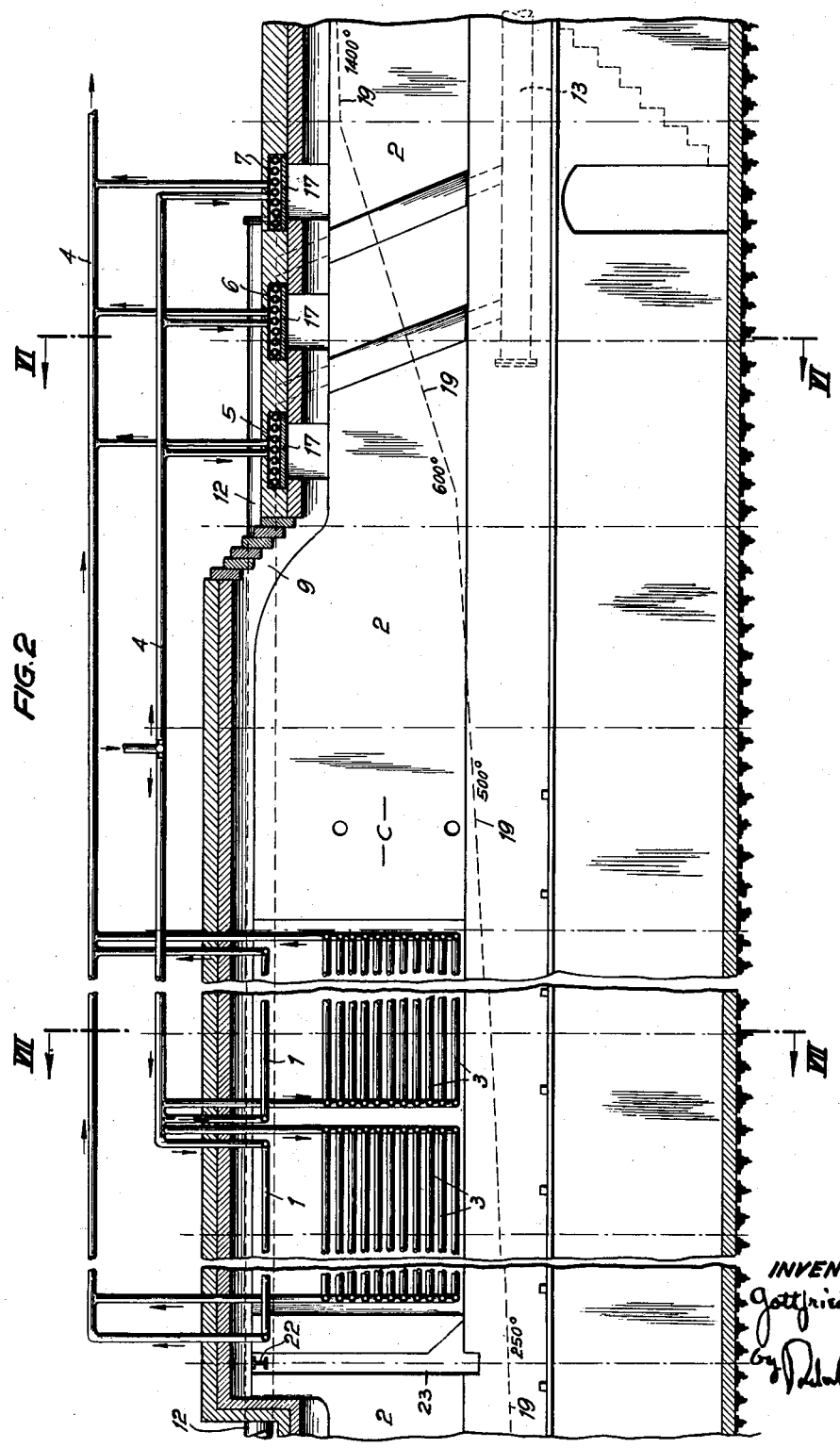

March 6, 1956     G. M. J. CREMER     2,736,943
TUNNEL KILN FOR FIRING CERAMIC ARTICLES
Original Filed Sept. 24, 1949     7 Sheets-Sheet 4
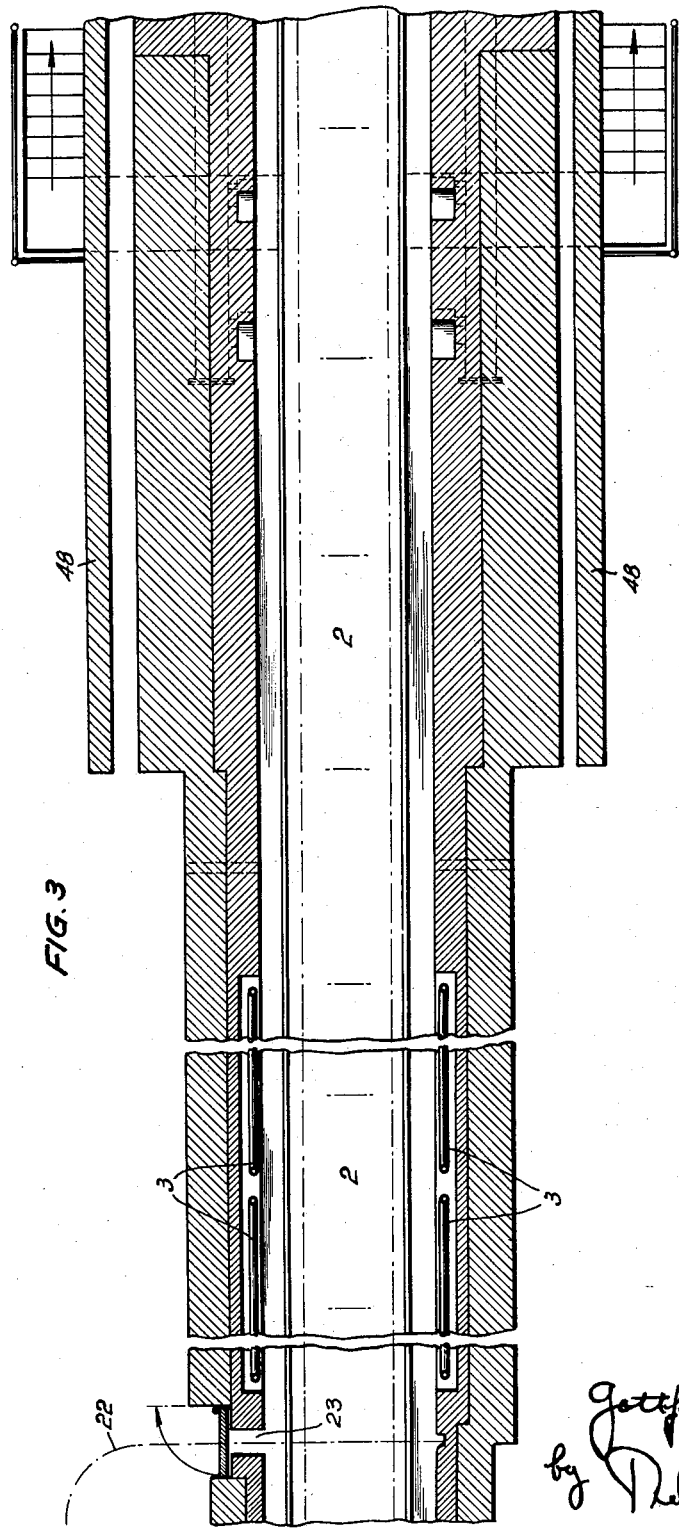
INVENTOR
Gottfried M. J. Cremer March 6, 1956  G. M. J. CREMER  2,736,943
TUNNEL KILN FOR FIRING CERAMIC ARTICLES
Original Filed Sept. 24, 1949  7 Sheets-Sheet 5

INVENTOR
Gottfried M. J. Cremer
by Malcolm W. Fraser
attorney

March 6, 1956 G. M. J. CREMER 2,736,943
TUNNEL KILN FOR FIRING CERAMIC ARTICLES
Original Filed Sept. 24, 1949 7 Sheets-Sheet 6

INVENTOR
Gottfried M. J. Cremer
by Malcolm W. Fraser
attorney

United States Patent Office 2,736,943
Patented Mar. 6, 1956

2,736,943
TUNNEL KILN FOR FIRING CERAMIC ARTICLES
Gottfried Maria Josef Cremer, Frechen, near Koln, Germany Original application September 24, 1949, Serial No. 117,693, now Patent No. 2,625,730, dated January 20, 1953. Divided and this application January 14, 1953, Serial No. 331,175

9 Claims. (Cl. 25—142)

This invention relates to a tunnel kiln for firing ceramic products which is not only suitable for firing the fine ceramic and refractory products hitherto customarily treated in tunnel kilns, but also mass-produced goods, such as tiles, roof tiles, and stoneware.

The invention refers particularly to the providing of means which allow a practically continuous transport of the usual carriages on which the goods to be burned are mounted through the kiln and to means enabling the regulation of the cooling operation in the kiln.

An object of the invention is to produce a new and improved kiln having the features of construction, arrangement and operation hereinafter described.

According to the invention the interior of the kiln is closed in respect of the outer atmosphere constantly during the advance of the firing carriages through the kiln passage by slide plates removably carried by the firing carriages only through a small section in the region of the admission end and only a small section in the region of the outlet end of the kiln. Suitable sealing is provided between the slide plates, carriages and kiln walls to prevent axial air flow. Said slide plates are introduced into and removed from the kiln through slots arranged in the walls of the kiln.

According to a further feature of the invention means are provided for operating the cooling zone of the tunnel kiln in such manner that in the first section of the cooling zone indirect, abrupt cooling takes place by means which suddenly remove heat, and in a following section of the kiln, in which transcrystallization takes place, there is a slow further cooling by additional cooling means, which in turn is followed by the most rapid possible withdrawal of heat through indirectly acting cooling means, this being followed in turn by final direct cooling by fresh air sucked out of the outlet end of the kiln. Such operating means consists of a number of heat exchangers, which are preferably metallic, through which cooling agents flow, and which are disposed in the arch and/or in the side walls of the kiln passage, their distribution preferably being uniform. By switching on and off a larger or smaller number of said heat exchangers and/or regulating the amount and speed of the cooling agents flowing through them, and by regulable screening of the heat exchangers the cooling zone is controlled. For this purpose use is made of temperature resistant slides, which are preferably made of ceramic material, and cover the heat exchangers to a larger or smaller extent individually or in groups, and are operated from outside the kiln passage.

This renders possible a fine regulation of the cooling-down curve and hence the adjustment of a cooling-down curve which is optimum for the particular ware to be fired, or of the corresponding temperature, for example not only in the middle of the cross-section of the kiln passage, but at every point of the latter. Because of the complete utilization of the cooling possibilities in the entire cooling range of the kiln passage, a substantial shortening of the total length of the cooling zone is possible in comparison with that otherwise required.

The heat exchangers, in accordance with a further feature of the invention can be provided not only in the cooling zone, but also additionally at the end of the firing zone and in the direct proximity of the burners. The heat exchangers permit in addition the production of the amount of heat required in each particular case for the total operation for the manufacturing plant in question, by switching on or off more or less of these units. In this way heat can be regained from the individual groups of cooling units—also in accordance with the temperatures which prevail in the kiln passage at the respective points—from the cooling media heated to different temperatures, in accordance with the purpose for which it is to be used, in the form of hot water, saturated steam, high pressure hot water, or superheated steam. The portion of the cooling zone which follows the indirectly cooled zone is cooled directly, namely by means of fresh air sucked in through the gateless, i. e. open outlet end of the kiln, which is closed off from the indirectly heated part and hence from the interior of the kiln. Since the temperature of this cooling air is not too high, it may undergo intermediate heating, for example by passage through one or more groups of the different heat exchangers, in which the appropriate conditions of temperature exist, and thereby be brought to the most convenient temperature for the relative part of the preheating zone. The smoke section is in this connection so constructed, that through the provision of openings, which are not situated opposite one another, in the walls of the kiln passage, the hot air flowing through this zone and drawn off out of the outlet end is guided to and fro, so that the ware is swept over by the hot air on all sides in the most favourable manner.

A part of the hot air produced by means of the heat exchangers from the first, indirectly cooled section may of course also be used in known manner as preheated air for combustion and supplied to the burners or furnace. Air for combustion preheated to far higher than 350° C., which hitherto was regarded as the maximum attainable temperature, can be obtained in this manner.

As a supplement to the step described, in accordance with a further feature of the invention, the actual combustion zone of the kiln passage can be constructed with double walls, so that additional amounts of heat can be gained from the space between, while avoiding radiation losses, which are the greatest precisely from the firing zone section.

The obtaining of additional amounts of heat which are needed only occasionally by heat exchangers which are disposed in the actual firing zone or in the vicinity of the burners does, it is true, entail an increase in the fuel consumption, but in view of the possibility of producing this additional amount of heat, which usually is required only temporarily, in the simplest possible manner, this is not a serious consideration. On the other hand, the operation of separate steam plants for these purposes, which is usually necessary precisely in the coarse ceramic industry, such as the tile and roof tile industry, can as a result be dispensed with.

Since the heat exchangers, as described, can be screened, the kiln can be operated in such manner that per se a water and steam capacity can be obtained which is sufficient for the winter months, while during the summer months sections of the heat exchangers are screened or otherwise cut out, and thus the entire kiln is operated with reduced production of hot water or steam, with a correspondingly lower fuel consumption.

Finally the thermal efficiency of the tunnel kiln is improved by reducing the radiation losses to a minimum, because the heat exchangers receive the heat, which would otherwise be lost by radiation through the walls.

The invention is described below in detail with reference to the drawings, which illustrate a tunnel kiln constructed in accordance with the invention, without the invention, however, being restricted with regard to its structural performance to the exemplified embodiment illustrated in the drawings. On the contrary, numerous modifications are possible without departing from the basic principle of the invention.

The drawings illustrate a tunnel kiln according to the invention, and in the same:

Figures 1 and 1a show a diagrammatical view of the whole kiln.

Figure 2 shows in an enlarged scale a longitudinal section through the sharp cooling zone.

Figure 3 shows a plan view corresponding to Figure 2.

The tunnel kiln consists, as is to be seen from Figures 1 and 1a, of the preheating zone, the firing zone and the cooling zone, through which the carriages are practically continuously advanced by means of the advancing or propelling device 33.

Figure 5:
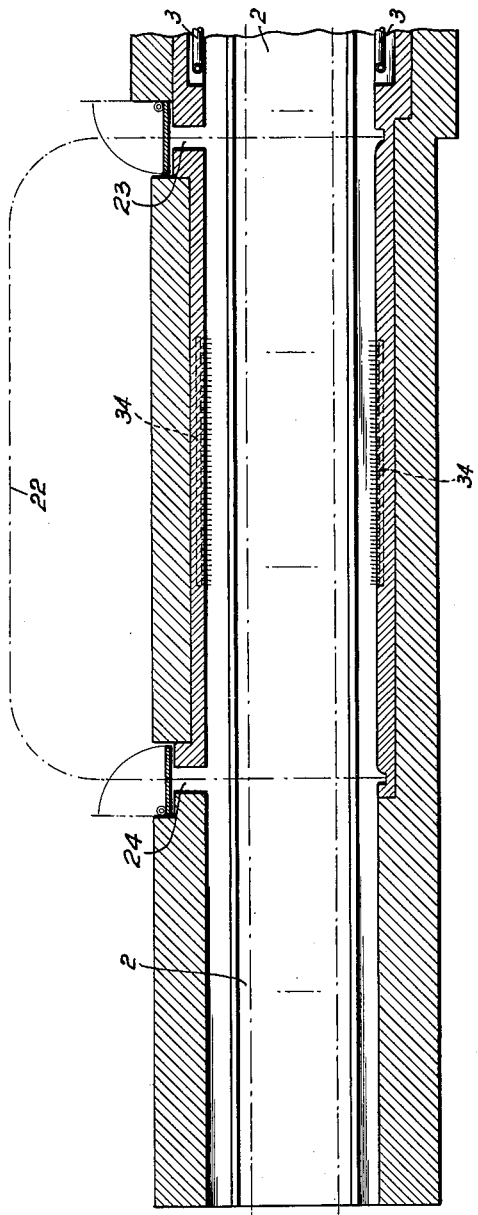
Figure 5 shows a plan view corresponding to Figure 4.

Figures 1 and 5 show the vertical slots 23 and 24 provided in one of the side walls of the kiln through which the slide plates 21, which effect the closing-off of the kiln-passage against the outer atmosphere and which are carried by the firing carriages 28 over short sections, are introduced and removed. These slide plates, suspended from gripper trolleys 22', are returned by means of return rails 22 after their removal from the kiln passage.

The slot 20 is between the preheating zone and the firing zone, and serves for the removal of the slide plate 21 mounted on the carriage before entering the kiln.

The slot 23 is arranged substantially beyond the slot 20 approximately midway of the cooling zone of Figure 1. A slot 24 in advance of the slot 23 is disposed a distance of the length of at least one carriage, preferably two or three up to four carriages from the end of the kiln. The slot 23 serves for introducing a slide plate and the slot 24 for taking out this slide plate.

The best spacing of the slots of each pair is selected according to the particular working conditions.

The slide plates 21 consist of metal plates corresponding to the form of the firing conduit cross-section. These plates are provided at the edges with flexible packings 25 which bear against the wall and the arch of the firing conduit and thus effect a shutting off with respect to the walls of the firing conduit. The packing can consist of metal brushes. It has been found particularly suitable to use steel brushes. The brushes form a kind of labyrinth seal which at the given pressures and gas velocities provides a sufficient sealing preventing the axial flow of air through the firing conduit. Instead of wire brushes packings consisting of glass wool, asbestos, or the like, can be used, these substances being reinforced by wire, fabric or the like.

The slides are so formed that they can be arranged at one end of every carriage and supported on the carriage platform by feet 29. The slots 20, 23 and 24 in the conduit walls are enlarged at the bottom as at 31, so that the feet 29 can pass therethrough.

Figure 4:
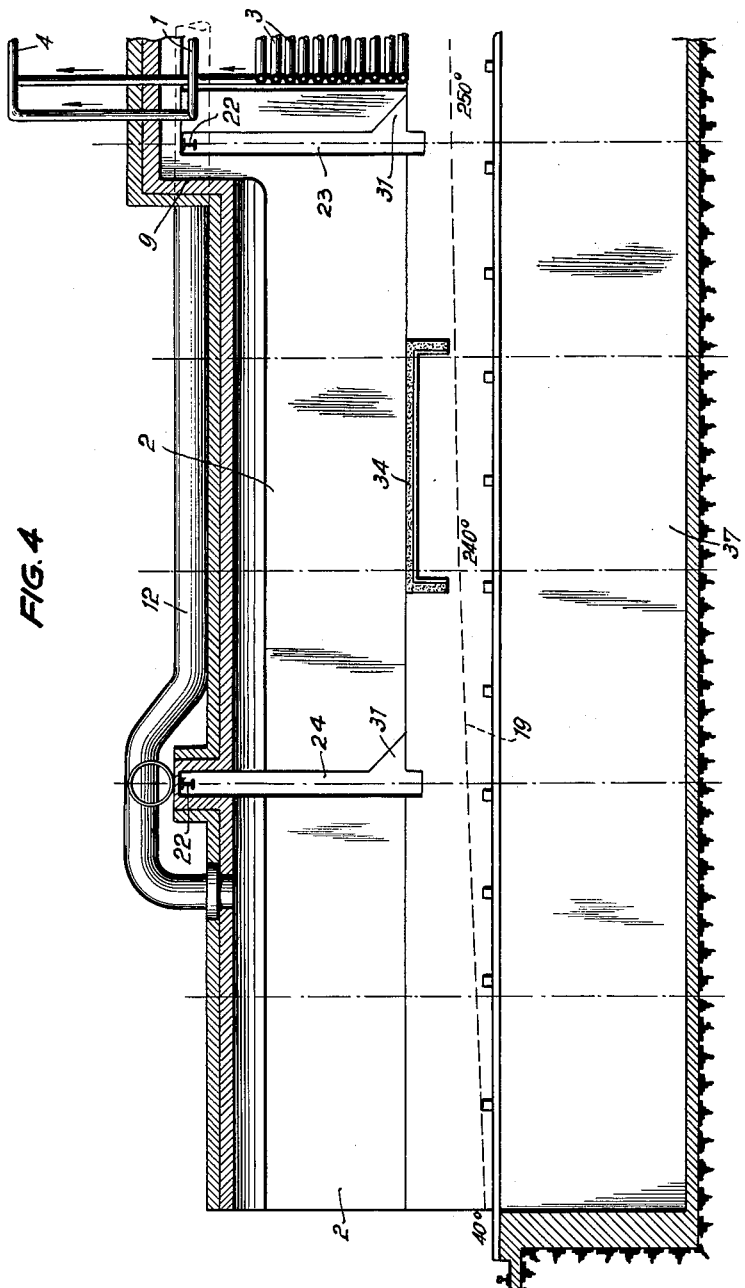
Figure 4 shows a longitudinal section through the end of the cooling zone.

To seal the platforms of the carriages 28 with respect to the side walls of the tunnel, brush packing joints 34 are provided on the side walls of the kiln channel over an extent amounting to at least the length of one carriage in front of the withdrawal slot of the cooling zone and within the range of the entry end of the oven. These brushes are preferably of reversed U-shape (Figure 4) and the edges of the ceramic carriage platforms are, contrary to previous practice, not profiled but made smooth.

Additionally sealing between the adjacent edges of the carriages has also to be provided in a suitable way, for example by interengaging parts of said edges.

By the described arrangement of the slide plates cooperating with sealing means a satisfactory seal is obtained of the interior of the kiln consisting of the preheating, firing and indirect cooling zones. Such seal is effective during the movement of the carriages, so that practically continuous progress of the firing carriages through the kiln is made possible.

As the introduction and withdrawal of the slide-plates during working is very simple and can be carried out extraordinarily rapidly, in particular when using suitable gripping devices, only short stopping periods to perform this operation are necessary. These pauses do not interrupt the practically continuous working process. The hydraulically driven advance device 33 is so adjusted that on termination of one forward stroke given by the length of the piston of said device one slide-plate will have reached the withdrawal slot, so that the latter can be withdrawn during the inactive return stroke of the piston.

The construction of the cooling zone according to the invention is particularly shown in Figures 2–7. In Figure 2 is indicated a dotted line 19 showing the characteristic shape of the cooling curve obtained according to the invention.

In the part of the cooling zone which directly follows the firing zone, and in which cooling takes place for example from 1400° to 600 or 700°, there are provided in the kiln walls metallic heat exchangers 5, 6, 7, 10 and 11 (Figures 1, 2 and 6), which are advantageously provided both in the side walls and in the arch. Contrarily to the exemplified embodiment, they may also run vertically or obliquely in the walls.

On account of the very high temperatures prevailing here, the heat exchangers in the first part of the cooling zone are preferably cooled by air. In the exemplified embodiment they are in fact in heat exchange relation to pipes 12 which supply the already preheated air out of the cooling end, which air is then, after flowing about the heat exchangers, passed on to the preheating zone through pipes 13 and introduced into the latter. Rising pipes leading to the burners 16 supply the latter with preheated air for combustion. The heat exchangers may also be operated with cold fresh air. The above mentioned and illustrated embodiment is however particularly advantageous in respect of the best possible thermal efficiency.

In addition to these heat exchangers, further banks 1 and 3 of such heat exchangers (Figures 1 and 2) which are traversed by water can be disposed in the kiln arch, and as shown, these banks are connected with the banks 5, 6 and 7 by common inlet and outlet pipes 4 and 4' respectively.

In the above described sharp cooling section C (Figure 1) of the cooling zone, the purpose of which is to lower the temperature of the fired ware to the critical point in the minimum time, the kiln passage cross-section is advantageously equal to that in the firing zone. According to the preferred embodiment of the invention, as illustrated in Figure 2, it is thereupon increased, in order thus to provide a free space above the firing carriages, in which the hot air produced (which is in any case ineffective for heating purposes) will collect.

In the first part of this latter zone C increased in height, which constitutes one of the important danger zones, preferably no special cooling means are installed, so that the cooling operation may take place as slowly as possible here. Sharper cooling starts only a few sections further on, namely after the temperature has fallen to 500° and lower. In the cooling zone there are provided in the arch of the kiln passage 2, covering the former entirely or partially, and preferably also in the side walls, banks of heat exchangers 1, 3 in the form of steel tubes, which are connected to a tube system 4, and through which the cooling water enters at a suitable point. These heat exchangers, which can be connected and disconnected in groups, are preferably so controlled that one of them may act as preheater, while the next one may bring the temperature of the water to the temperature of use.

The banks of heat exchangers are illustrated only diagrammatically in Figures 2, 3, 6 and 7, and alterations are possible as to their arrangement, without departing from the principle of the invention.

Figure 6:
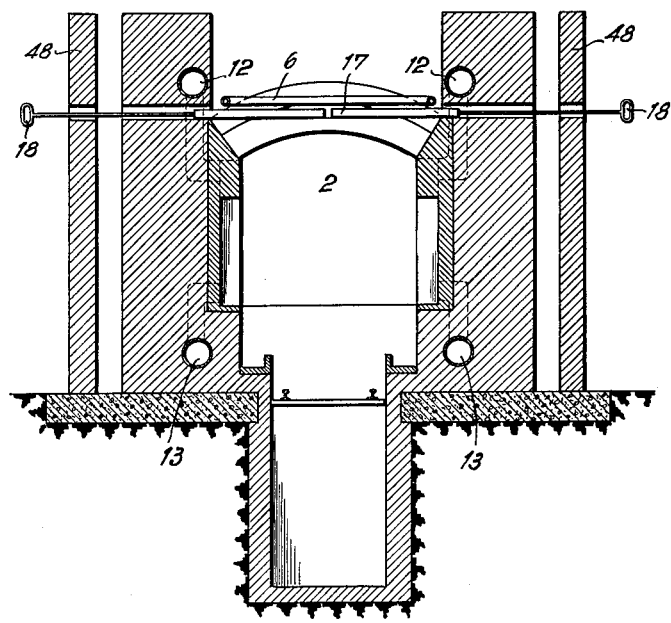
Figure 6 shows a section on the line VI—VI in Figure 2.
Figure 7:
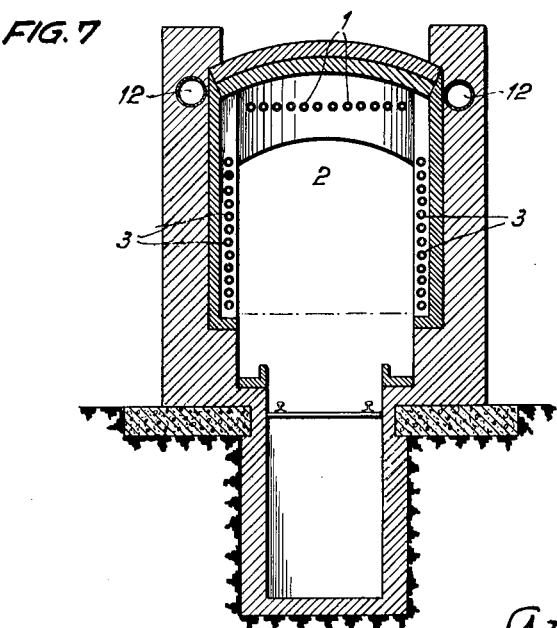
Figure 7 shows a section on the line VII—VII in Figure 2.

The amount of heat given up to the heat exchangers is controlled according to the invention by temperature-resisting, preferably ceramic slides, which are so disposed that they screen the heat exchangers to a lesser or greater extent in respect to the firing passage, as shown in particular in Figure 6. The slides 17 are located beneath the heat exchangers 6, when they are closed, separate off the arch space. They are operated by rods 18. Manufacture of the slides from ceramic material ensures that, when the slides are closed, the screened-off section of the respective heat exchangers absorbs practically no heat. These slides may of course not only serve to control in a desirable manner the temperature in the firing passage itself, but at the same time also to control the temperature of the cooling medium or of the air to be preheated.

With the aid of the radiation of heat to the heat exchangers which is regulable by means of the slides 17, it is possible to ensure over the entire cross-section of the passage the desired temperature curve in the sharp cooling zone and the final cooling zone. The temperature curve may for example have the shape shown in the broken line 19 in Figures 2 and 4. It is there shown that the temperature drops more or less abruptly from about 1400° upwards to a temperature of about 600°, then constantly declining to about 40° over the further longitudinal extent of the furnace. Any other shape of the cooling curve can be adjusted in similar fashion, if the ware fired demands this.

With regard to the actual firing zone, apart from the previously mentioned arrangement of the heat exchangers for producing additional heat in the direct proximity of the burners, the additional devices in accordance with the invention are restricted to the double-walled construction of the firing zone, which can be seen from the corresponding drawings (Figure 6, outer casing 48).

The form of construction of a tunnel kiln, described in detail herein above and illustrated in the drawings, for carrying out the invention, is naturally only an example and can be varied in various ways without departing from the basic principles of the invention, while the invention is furthermore not restricted to the simultaneous use of all the measures described, but certain of them individually will also already lead to considerable improvements as compared with the method of working hitherto known.

This application constitutes a division of my application Serial No. 117,693, filed September 24, 1949, and entitled "Process for Firing Ceramic Articles," now Patent 2,625,730, dated January 20, 1953.

I claim:

1. An open-ended tunnel kiln having successively arranged preheating, firing and cooling zones, said kiln comprising carriage means for progressing articles to be fired through the kiln, metallic heat exchangers within the cooling zone, and sealing means detachably mounted on the carriage means and movable therewith thereby to seal the heat exchangers from the other kiln portions.

2. An open-ended tunnel kiln as claimed in claim 1, in which the sealing means comprise high temperature resistant slides of ceramic material of a shape similar to the cross sectional dimension of the kiln interior.

3. An open-ended tunnel kiln having successively arranged preheating, firing, and cooling zones, said kiln comprising carriage means for progressing articles to be fired through the kiln, metallic heat exchangers within the cooling zone, means for recurrently screening the heat exchangers from adjacent portions of the interior of the kiln, slide plates, the tunnel having slots respectively in the cooling zone and near the entrance to the kiln through which said slide plates may be introduced into and removed from the kiln means on the carriage means for mounting said slide plates on the carriage means, and means on the outside of the kiln for introducing and removing the slide plates through the slots respectively to and from the carriage means.

4. An open-ended tunnel kiln as claimed in claim 1, in which certain of said metallic heat exchangers are arranged in the cooling zone adjacent the firing zone, the next successive portion of the cooling zone being free of heat exchangers, metallic heat exchangers in the final portion of the cooling zone, the last-named heat exchangers being spaced substantially from the outlet end of the kiln, the outside air effecting direct cooling of the outlet end of the kiln, and means for supplying cooling media to said metallic heat exchangers.

5. Apparatus of the class described, comprising a tunnel kiln having preheating, firing and cooling zones, firing carriages movable through the tunnel kiln, slide plates removably carried by said carriages, means to effect a seal between said carriages and the kiln walls, said kiln having spaced slots enabling the slide plates to be mounted upon the carriage through one slot and removed from the carriage through the other slot from the outside of the kiln, and means on the outside of the kiln for conveying the slides from one slot to the other.

6. Apparatus of the class described, comprising a tunnel kiln having preheating, firing and cooling zones, firing carriages movable through the tunnel kiln, slide plates removably carried by said carriages, means to effect a seal between said slide plates on the carriages and the kiln walls, said kiln having spaced slots enabling the slide plates to be mounted upon the carriage through one slot and removed from the carriage through the other slot from the outside of the kiln, and means on the outside of the kiln for conveying the slide plates from one slot to the other, said conveying means including a slide plate gripping device and by-pass rails.

7. Apparatus of the class described, comprising a tunnel kiln having preheating, firing and cooling zones, the cooling zone including a sharp cooling section, firing carriages movable through the tunnel kiln, slide plates removably carried by said carriages, means to effect a seal between said slide plates on the carriages and the kiln walls, said kiln having spaced slots enabling the slide plates to be mounted upon the carriage through one slot and removed from the carriage through the other slot from the outside of the kiln, and means on the outside of the kiln for conveying the slide plates from one slot to the other, said conveying means including a slide plate gripping device and by-pass rails, one slot being between the preheating zone and the firing zone serving for the removal of a slide plate, a further slot being at the end of the sharp cooling section serving for the introducing of a slide plate, and a further slide removal slot disposed at a distance from the outlet end of the kiln at least equal to the length of one carriage.

8. Apparatus of the class described, comprising a tunnel kiln having preheating, firing and cooling zones, carriages movable through the tunnel kiln, slide plates removably carried by the carriages, said kiln having spaced slots enabling said slide plates to be mounted upon the carriages through one slot and removed from the carriage through another slot in a subsequent area from the outside of the kiln, said slide plates having forms corresponding substantially to the cross section of the inside of the kiln, and flexible packing on the edges of the slide plates for slidably sealing the slide plates against the kiln walls.

9. The combination claimed in claim 8, and brush sealing means affixed on the interior of the kiln respectively in the preheating and cooling zones, said brush sealing means having dimensions lengthwise of the tunnel approximately equal to the length of said carriages and engaging against said carriages.

References Cited in the file of this patent

UNITED STATES PATENTS

| | | |
|---|---|---|
| 248,801 | Sebillot | Oct. 25, 1881 |
| 1,361,977 | Fuller | Dec. 14, 1920 |
| 1,503,750 | Dressler | Aug. 5, 1924 |
| 1,610,968 | Robertson | Dec. 14, 1926 |
| 1,913,302 | Barker | June 6, 1933 |